(12) United States Patent
Fraasch et al.

(10) Patent No.: US 12,508,071 B2
(45) Date of Patent: Dec. 30, 2025

(54) METHODS AND APPARATUS FOR REDUCING LEAKAGE CURRENTS IN CRYO, RADIO-FREQUENCY, AND PULSED-FIELD ABLATION SYSTEMS

(71) Applicant: Medtronic, Inc., Minneapolis, MN (US)

(72) Inventors: Steven J. Fraasch, Maple Grove, MN (US); Trenton J. Rehberger, Minneapolis, MN (US); Sara A. Frantz, Mounds View, MN (US); Kevin D. Gollon, Lakewood, OH (US); Bryce W. Bunkers, Crystal, MN (US)

(73) Assignee: Medtronic, Inc., Minneapolis, MN (US)

( * ) Notice: Subject to any disclaimer, the term of this patent is extended or adjusted under 35 U.S.C. 154(b) by 553 days.

(21) Appl. No.: 17/982,759

(22) Filed: Nov. 8, 2022

(65) Prior Publication Data

US 2023/0149071 A1     May 18, 2023

Related U.S. Application Data

(60) Provisional application No. 63/279,346, filed on Nov. 15, 2021.

(51) Int. Cl.
*A61B 18/14* (2006.01)
*A61B 18/00* (2006.01)
*G01R 31/52* (2020.01)

(52) U.S. Cl.
CPC .......... *A61B 18/1492* (2013.01); *G01R 31/52* (2020.01); *A61B 2018/00577* (2013.01);
(Continued)

(58) Field of Classification Search
CPC ...... A61B 18/1492; A61B 2018/00577; A61B 2018/00642; A61B 2018/0072; A61B 2018/00827; G01R 31/52
See application file for complete search history.

(56) References Cited

U.S. PATENT DOCUMENTS

| | | |
|---|---|---|
| 10,709,492 B2 | 7/2020 | Lichtenstein |
| 2020/0036180 A1 * | 1/2020 | Spesser ..................... H02J 7/02 |

FOREIGN PATENT DOCUMENTS

| | | | |
|---|---|---|---|
| CN | 113363921 A | 9/2021 | |
| CN | 113363951 A * | 9/2021 | .......... H02H 1/0007 |

(Continued)

OTHER PUBLICATIONS

International Search Report and Written Opinion for Application No. PCT/US2022/049663 dated Mar. 17, 2023 (11 pages).

*Primary Examiner* — Linda C Dvorak
*Assistant Examiner* — Abigail Bock
(74) *Attorney, Agent, or Firm* — Michael Best & Friedrich LLP (57) ABSTRACT

Methods and apparatus for monitoring and actively reducing leakage currents flowing on patient applied parts used in ablation therapy. In an example, a signal-processing circuit connected between a toroidal-coil sensor and a sleeve-capacitor coupler, both AC-coupled to the catheter cable, applies a Fourier transform and an energy minimization algorithm to the output of the toroidal-coil sensor to determine amplitudes and phases for frequency components of the signal applied to the sleeve-capacitor coupler. A corresponding current coupled through the sleeve-capacitor coupler into the catheter cable counteracts the leakage current to force the total non-therapy electrical current flowing on the patient applied parts to a level that is lower than a fixed threshold value, e.g., selected in accordance with an applicable standard.

20 Claims, 6 Drawing Sheets

(52) U.S. Cl.
CPC ............... *A61B 2018/00642* (2013.01); *A61B 2018/0072* (2013.01); *A61B 2018/00827* (2013.01)

(56) References Cited

FOREIGN PATENT DOCUMENTS

| WO | WO-2011044338 A2 | * | 4/2011 | ..... A61B 17/320068 |
| WO | WO-2019113014 A1 | * | 6/2019 | ..... A61B 17/320068 |

* cited by examiner

METHODS AND APPARATUS FOR REDUCING LEAKAGE CURRENTS IN CRYO, RADIO-FREQUENCY, AND PULSED-FIELD ABLATION SYSTEMS

CROSS-REFERENCE TO RELATED APPLICATIONS

This application claims the benefit of U.S. Provisional Patent Application No. 63/279,346, filed 15 Nov. 2021, and entitled "METHODS OF CANCELLING LEAKAGE CURRENTS IN CRYO, RADIO FREQUENCY AND PULSED FIELD ABLATION SYSTEMS," which is incorporated herein by reference in its entirety.

FIELD

This disclosure relates to methods and systems associated with ablation catheters used with cryoablation, pulsed field ablation (PFA), and radio-frequency (RF) ablation generators and other medical devices.

BACKGROUND

Cardiac arrhythmias disrupt normal heart rhythm and reduce cardiac efficiency. These arrhythmias can be treated using cryoablation, PFA, and/or RF ablation therapy. The delivery of ablation therapy involves the use of a reliable, powerful, and precisely controlled source of electrical energy, e.g., in the form of a high-voltage pulse or RF generator. Electrical pulses or continuous wave (CW) sinusoids are delivered to the intended endocardial sites to perform reversible or irreversible electroporation in the case of PFA, and thermally induced necrosis via RF using an ablation-therapy delivery device. Reversible electroporation is used to reverse permeabilize cells to catalyze acceptance of genes or drugs, whereas irreversible electroporation is used to create permanent and lethal nanopores which can electrically isolate target areas of the myocardium and prevent arrhythmias, such as atrial fibrillation. The use of RF energy creates lesions via thermal necrosis which also isolates target areas of myocardium.

SUMMARY

Disclosed herein are, among other things, various aspects, features, and embodiments of methods and apparatus for monitoring and actively reducing leakage currents flowing on patient applied parts used in ablation therapy. In an example, a signal-processing circuit connected between a toroidal-coil sensor and a sleeve-capacitor coupler, both AC-coupled to the catheter cable, applies a Fourier transform and an energy minimization algorithm to the output of the toroidal-coil sensor to determine amplitudes and phases for frequency components of the signal applied to the sleeve-capacitor coupler. A corresponding current coupled through the sleeve-capacitor coupler into the catheter cable counteracts the leakage current to force the total non-therapy electrical current flowing on the patient applied parts to a level that is lower than a fixed threshold value, e.g., selected in accordance with an applicable standard.

One example provides a medical-treatment apparatus including a current sensor AC-coupled to wiring of a catheter cable. The apparatus also includes a signal-processing circuit configured to generate an output current based on spectral content of a first current sensed by the current sensor in the catheter cable. The apparatus additionally includes an AC-signal coupler connected to receive the output current from the signal-processing circuit and positioned along the catheter cable. The signal-processing circuit is configured to generate the output current such that a second current coupled by the AC-signal coupler into the wiring of the catheter cable in response to the output current counteracts the first current to force a combination of the first current and the second current to a level that is lower than a fixed threshold value.

Another example provides a medical-treatment method, comprising the step of sensing a first current in a catheter cable using a current sensor AC-coupled to wiring of the catheter cable. The medical-treatment method further comprises the step of determining spectral content of the first current by applying a Fourier transform to a digital signal generated by digitizing an output signal of the current sensor and the step of generating an output current based on the spectral content. The medical-treatment method further comprises the step of applying the output current to an AC-signal coupler to couple a second current into the wiring such that the second current counteracts the first current to force a combination of the first current and the second current to a level that is lower than a fixed threshold value.

BRIEF DESCRIPTION OF THE DRAWINGS

A more complete understanding of embodiments described herein, and the attendant advantages, aspects, and features thereof, will be more readily understood by reference to the following detailed description when considered in conjunction with the accompanying drawings, wherein.

DETAILED DESCRIPTION

It is noted that some embodiments reside in combinations of apparatus components and processing steps related to metering and cancelling low levels of undesired alternating current passing into a patient from a cryo-ablation, PFA, or RF ablation system. Accordingly, the system and method components have been represented where appropriate by conventional symbols in the drawings, showing only those specific details that are pertinent to understanding various embodiments so as not to obscure the disclosure with details that will be readily apparent to those of ordinary skill in the pertinent art having the benefit of the description herein.

Cryoablation, PFA, and RF ablation methods are significant in power and energy. As a result, the catheter cable used to deliver PFA or RF energy to the heart chamber faces numerous constraints and design challenges that need to be addressed for reliable, safe transmission. An important design constraint enforced by the International Electrotechnical Commission (IEC), via its standard 60601-1, *Medical* electrical equipment—Part 1: General requirements for basic safety and essential performance, is to limit to relatively low levels the amount of tissue-inserted catheter non-therapy electrical current capable of presenting an electrical shock hazard. According to the IEC 60601-1 standard, Section 8.7.3, Table 3, no more than a 10 µA current under normal conditions or no more than a 50 µA current for a single fault condition (such as an inadvertent alternating current (AC) mains connection to a patient) is allowed to drain from or source into a type CF (cardiac floating) applied part (e.g., an ablation catheter) in tissue contact with the patient. This undesirable leakage current can be reduced to within acceptable limits by eliminating extraneous conduction paths between the patient applied part (AP) catheter and surroundings. Nearly all modern medical electrical equipment found in a catheter lab has means for isolating the operator and patient from the AC power mains and earth surroundings. Yet, because the isolating devices are applied between the AC power mains and circuit loads, these measures only create a barrier against current flowing back towards the power source but may still be ineffective towards preventing errant currents from flowing into isolated patient connections that distribute capacitance between the catheter and surroundings.

Figure 1:
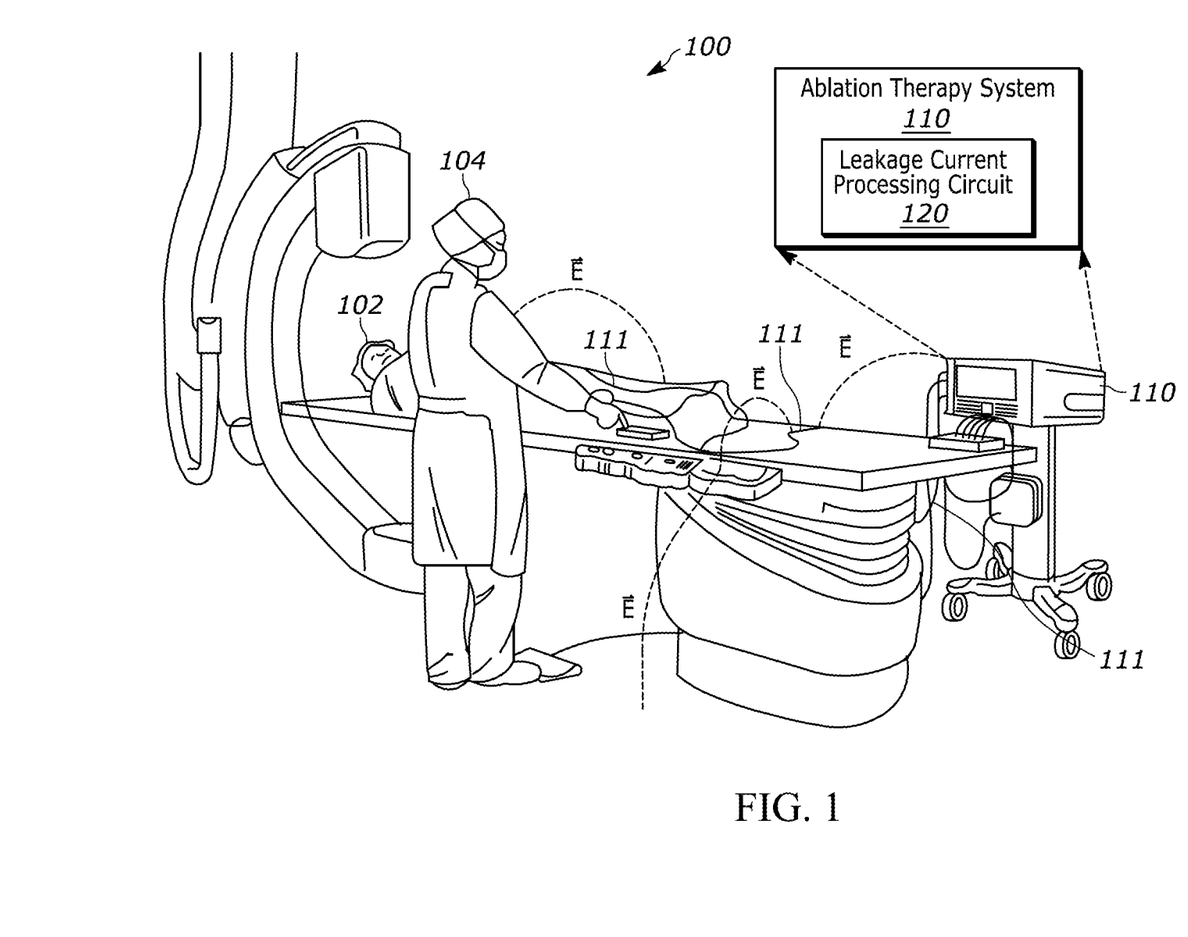
FIG. 1 is an illustration of a catheter-lab environment according to various examples.

FIG. 1 illustrates a catheter-lab environment 100 having an ablation therapy system 110 for treating a patient 102 with PFA or RF ablation. Example electric fields E corresponding to the catheter capacitive leakage paths occurring along a catheter cable 111 (or more generally, a patient therapy cable 111) are represented by curved dashed lines in FIG. 1. Those electric field lines in FIG. 1 approximately represent distributed capacitance between the catheter cable 111 and various items that are at earth or "ground" potential, which creates an undesired leakage-current return-path circuit in the catheter-lab environment 100. Such items typically include but are not limited to the cryoablation, RF and/or PFA generator, the electrophysiological recorder and related equipment, the floor, and the AC mains wiring. To counteract undesired leakage currents coupling to the catheter cable 111 through the leakage-current return-path circuit, in some examples, the ablation therapy system 110 includes a leakage-current processing circuit 120, as indicated in the expansion block diagram of the ablation therapy system 110 shown in FIG. 1. The leakage-current processing circuit 120 is described in more detail below, e.g., in reference to FIG. 4.

Figure 2:
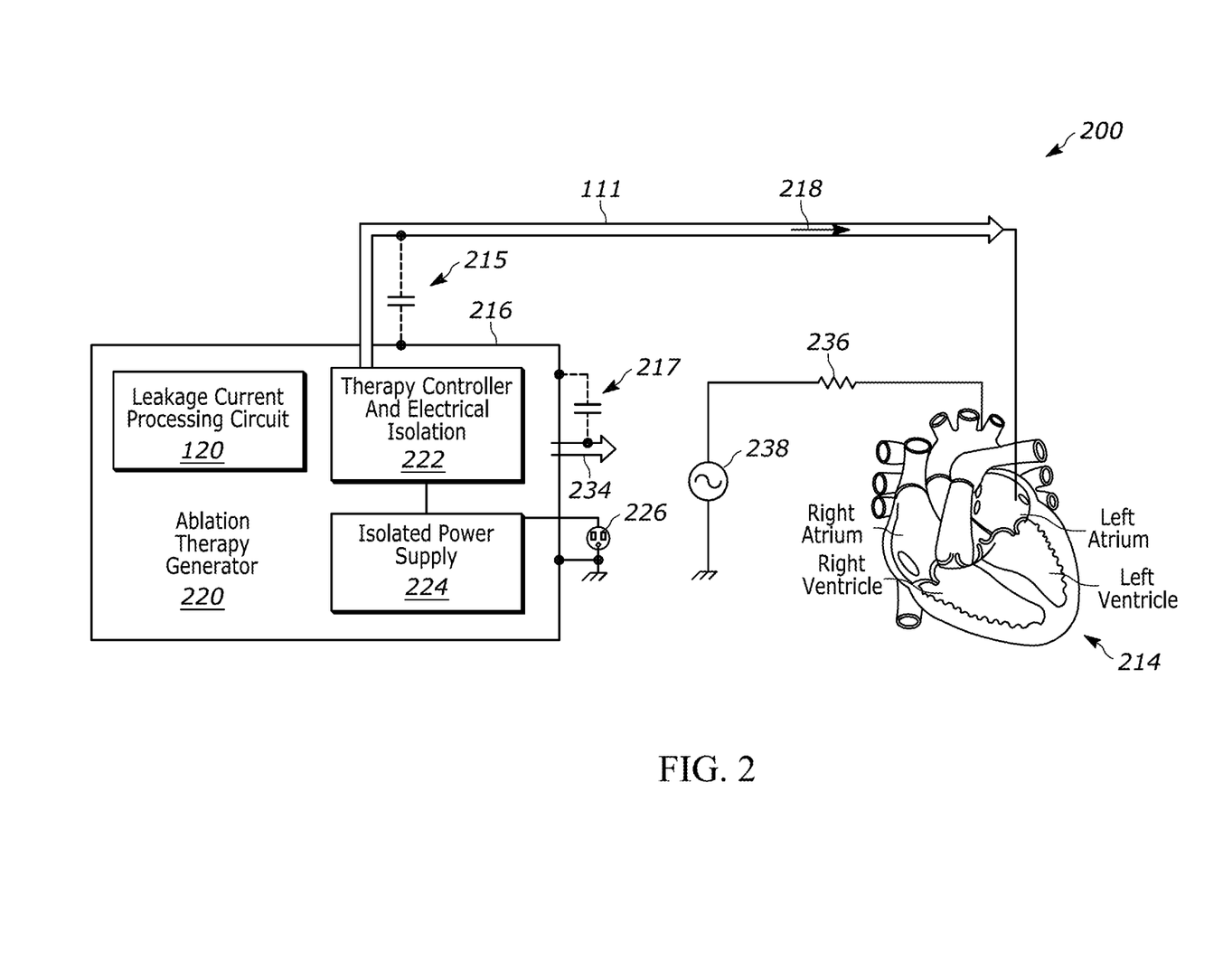
FIG. 2 is a block diagram illustrating an effective electrical circuit existing in the catheter-lab environment of FIG. 1 according to various examples.

FIG. 2 is a block diagram illustrating an effective electrical circuit 200 existing in the environment 100 according to various examples. More specifically, the circuit 200 may exist when the ablation therapy system 110 is applied to treat a heart 214 of the patient 102. The circuit 200 includes an ablation therapy generator 220 comprising the leakage-current processing circuit 120, an electronic-controller unit 222, and an isolated power supply 224 connected to an AC mains power outlet 226. The controller unit 222 is connected to receive a therapy supply voltage from the power supply 224 that operates to convert the AC mains power of the outlet 226 to a direct current (DC) therapy supply voltage, which is then used to deliver treatment, via the catheter cable 111, to the heart 214. A capacitance 215 schematically represents the distributed capacitance between the catheter cable 111 and a chassis 216 of the ablation therapy generator 220. In some examples, a cable 234 is connected to the generator 220 to carry electrogram (EGM), electromyogram (EMG), or electrocardiogram (ECG) signals to the patient 102. A capacitance 217 schematically represents the distributed capacitance between the cable 234 and the chassis 216.

The chassis 216 is typically electrically grounded to provide electrical shielding to various components of the generator 220 and, in some examples, to the ablation therapy system 110. In addition to the treatment signals from the controller 222, the catheter cable 111 typically carries a leakage current 218 AC-coupled thereto through the distributed capacitance 215 as indicated above. In operation, the leakage-current processing circuit 120 is used to counteract the leakage current 218 as described in more detail below.

In some examples, the circuit 200 further includes an electrical connection to the heart 214 comprising a tissue impedance 236 in electrical series with a voltage source 238. The tissue impedance 236 is about the amount that a typical human body would resist according to the IEC 60601-1 standard, Section 8.7. The voltage source 238 typically is an inadvertent or accidental connection to the mains AC voltage in the environment 100. In some examples, the voltage source 238 is an electrical terminal connected to another AC mains power outlet analogous to the outlet 226.

Although the leakage-current processing circuit 120 is shown in FIG. 2 as being internal to the ablation therapy generator 220, various embodiments and examples are not so limited. In some examples, the leakage-current processing circuit 120 is placed in a suitable location external to the ablation therapy generator 220. In some other examples, the leakage-current processing circuit 120 has several components thereof placed at different respective locations.

The following numerical estimates illustrate certain parameters of the circuit 200 according to some nonlimiting examples. When the leakage mechanism does not contain other resistive or inductive leakage paths, compliance with the above-mentioned standard 60601-1 is achieved with the total distributed capacitance 215 that is low enough to present a sufficiently high impedance Z at the AC mains frequency (e.g., 50 Hz or 60 Hz) to limit the leakage current 218 to less than 50 µA for a single fault, mains applied part (MAP) condition, e.g., according to Eq. (1).

$$Z > \frac{252 \ VAC}{50 \ \mu A} = 5.0 \ M\Omega \quad (1)$$

Herein, 252VAC is approximately the nominal line voltage of 230VAC plus a 10% tolerance. Thus, a limitation on the corresponding distributed capacitance 215 ($C_{215}$) between the catheter cable 111 and the surroundings (including the chassis 216) passing a current at 50 Hz can be estimated using Eq. (2):

$$C_{215} < \frac{1}{2\pi \ 50 \ Hz \ 5.04 \ M\Omega} = 632 \ pF \quad (2)$$

The amount of capacitance in accordance with Eq. (2) can thus be used as a design constraint for RF and PFA ablation systems. For example, a capacitance greater than 632 pF will likely displace a MAP current exceeding 50 micro-Amperes (µA). Although the above example satisfies the IEC 60601-1, Section 8.7.3, leakage-current limits in some geographies, such as Australia—New Zealand (ANZ), China, and Europe, an evaluation or regulatory agency in some other geographies, such as in countries that provide similar line voltage at a higher frequency, is unlikely to certify leakage-current compliance for the corresponding ablation therapy system. For example, South Korea's standard AC mains power is 220VAC+10% at 60 Hz. In the case of South Korea, the distributed capacitance 215 needs to be less than 548 pF to achieve compliance.

Some conventional methods directed at reducing the leakage currents 218 use external means of isolating the entire ablation system from the AC mains lines. Such methods typically rely on the use of isolation transformers and uninterruptible power supplies (UPSs). While the corresponding systems can typically provide adequate leakage-current reduction, such systems typically have technical limitations. For example, one of such technical limitations is that connections to the ablation generating equipment that provide an earth or ground potential may need to be avoided. Otherwise, the earth-connected circuit can provide an undesired leakage path. Yet, without the protective earth ground, a system operator (such as a practitioner 104, FIG. 1) may be exposed to an electrical-shock hazard in at least some situations, e.g., when the "floating" equipment cabinet contacts a high voltage node or the AC mains voltage. Also, equipment that is not earth grounded may induce noise capable of distorting cardio and other physiological signals, such as EGM, EMG, and ECG signals (also see 234, in FIG. 2). Therefore, maintaining a good signal-to-noise ratio (SNR) and sufficient signal integrity is an expected feature of the ablation equipment. For example, a low noise rendering of an EGM displayed on an EP recorder after or during an ablation-therapy procedure typically informs the attending electrophysiologist (e.g., 104, FIG. 1) of acute therapy effectiveness and, as such, is an important expectation. Any possible impairment of such signals contrary to this expectation provides a motivation for finding a technical solution directed at inhibiting leakage currents, such as the leakage current 218.

The IEC 60601-1 standard allows up to twice the single accessory MAP limit, or 100 µA, in the case of multiple patient connections. Yet, an ablation system making other patient connections, such as those to a second energy-delivery catheter, a coronary sinus (CS) catheter, an EP recorder, and/or surface ECG leads may increase the corresponding distributed capacitance to an amount that causes the multi-accessory 100 µA MAP limit to be exceeded. Where difficulty is encountered in reducing to a relatively low level the ablation-system capacitance possessing only a single catheter cable 111, it may be even more difficult to reduce the distributed capacitance with multiple patient connections.

The above indicated and possibly some other related problems in the state of the art can beneficially be addressed using at least some embodiments disclosed herein. For example, some embodiments implement an active-correction approach, using which the MAP leakage-current goals can be met under a variety of usage scenarios.

Figure 3:
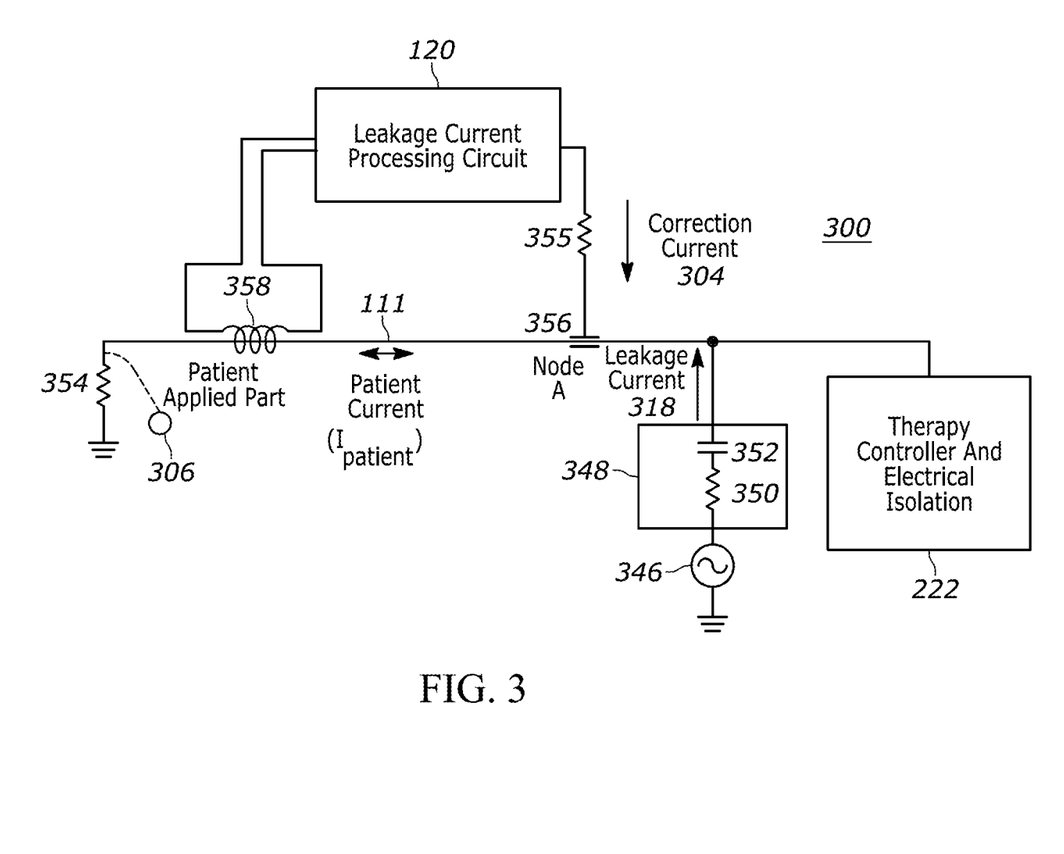
FIG. 3 is a block diagram illustrating a circuit portion of the effective electrical circuit of FIG. 2 according to various examples.

FIG. 3 is a block diagram illustrating a circuit portion 300 of the effective electrical circuit 200 according to various examples. The circuit portion 300 includes the leakage-current processing circuit 120 connected to a current sensor 358 and a current coupler 356 as indicated in FIG. 3. In operation, the sensor 358 provides a measure of a leakage current 318 flowing toward the patient 102 along the catheter cable 111. The leakage current 318 is typically induced through a variety of leakage and accidental paths collectively represented in the circuit portion 300 by the series including a current source 346 and an impedance 348. The current source 346 is an effective leakage source representing a combination of different leakage and accidental sources the composition of which depends on the specific example. In some examples, the current source 346 includes one or more distributed sources capacitively coupled to the catheter cable 111 through the capacitance 215 and one or more lumped sources, such as the voltage source 238. The impedance 348 is an effective impedance that includes an effective resistance 350 and an effective capacitance 352. In some examples, the capacitance 215 represents a portion of the capacitance 352.

Figure 4:
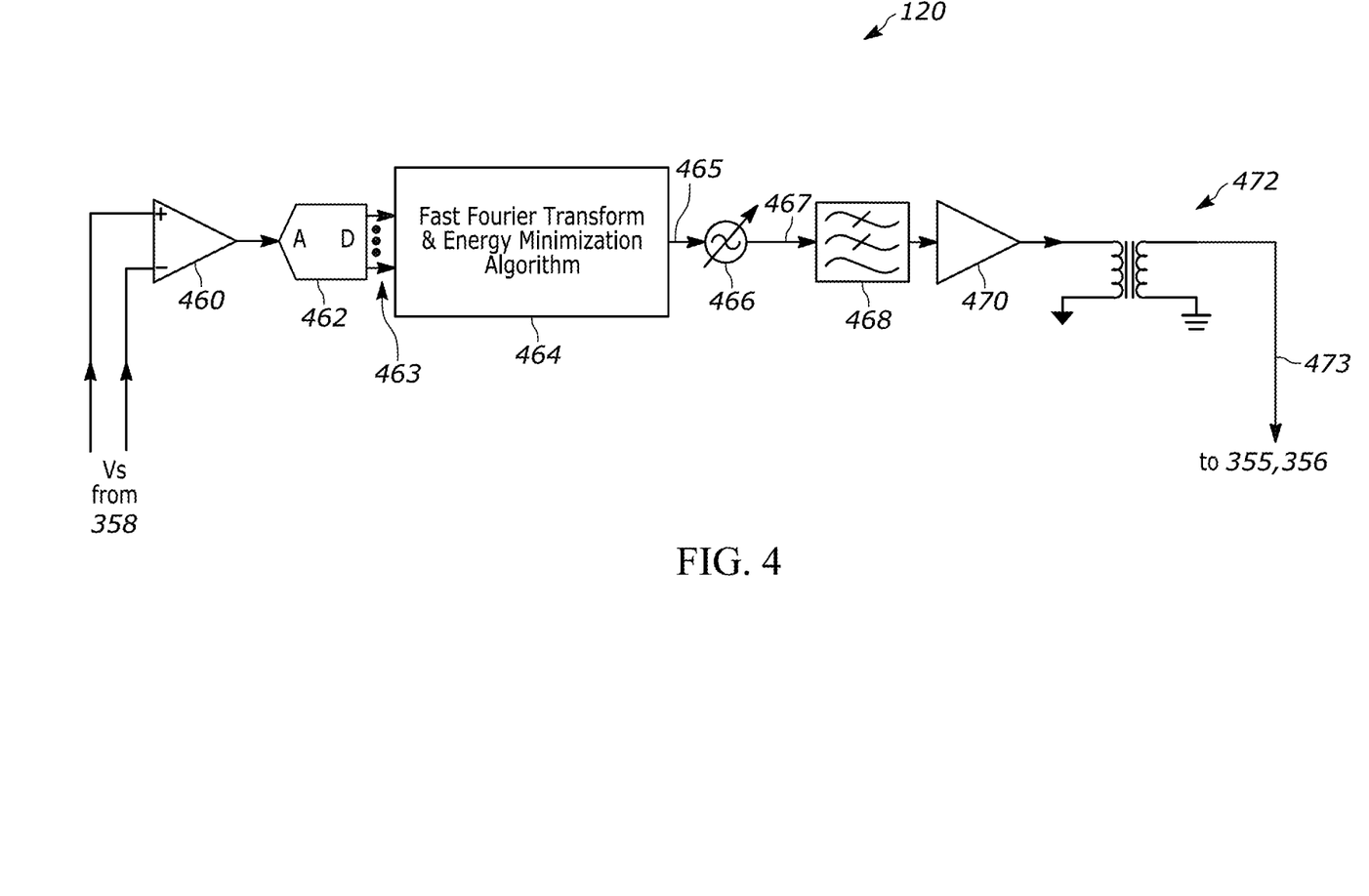
FIG. 4 is a block diagram illustrating a leakage-current processing circuit that can be used in the circuit portion of FIG. 3 according to various examples.

In response to the measure of the leakage current 318 provided by the current sensor 358, the leakage-current processing circuit 120 generates an output current which is directed through a resistance 355 to the current coupler 356. In response to the output current, the current coupler 356 applies to the catheter cable 111 a correction current 304. Signal processing implemented in the leakage-current processing circuit 120 causes the correction current 304 to be such that the combination of the currents 304 and 318 is smaller than one or more pertinent thresholds specified in the IEC 60601-1 standard. Such combination current is typically the non-therapy current that acts on the patient 102 through an effective patient resistance 354 and a patient applied part 306 of the catheter connected to the catheter cable 111. In various examples, the correction current 304 counteracts the leakage current 318, thereby reducing, canceling, or minimizing the effective non-therapy current $i_{patient}$ acting on the patient 102. In some examples, the correction current 304 cancels the leakage current 318 in accordance with Eq. (3):

$$i_{patient} = i_{318} + i_{304} \approx 0 \ \mu A \quad (3)$$

where $i_{318}$ and $i_{304}$ denote the currents 318 and 304, respectively. Example signal processing implemented in the leakage-current processing circuit 120 and capable of achieving the result expressed by Eq. (3) is described in more detail below in reference to FIG. 4.

In one specific example corresponding to FIG. 3, various pertinent elements of the circuit portion 300 have the following characteristics. The output of the leakage-current processing circuit 120 is at 477 V, has the frequency of 60 Hz, and the relative phase of 164 degrees. The leakage-current source 346 is at the effective voltage of 311 V, the frequency of 60 Hz, and the relative phase of 0 degrees. The resistances 350, 354, and 355 are 1 MΩ, 1 kΩ, and 100 kΩ, respectively. The capacitances 352 and 356 are 800 pF and 500 pF, respectively. For this specific example, by applying Kirchoff's Current Law at Node A indicated in FIG. 3, the resulting patient current applying the numerical values in Eq. (3) are as follows:

$$i_{patient} = \frac{311/0°}{3.47e6/-73.2°} + \frac{477/164°}{5.31e6/-88.9°} \approx 0.4 \ \mu A \ peak \quad (4)$$

The values shown in Eq. (4) are in phasor form. Without the correction applied by the circuit 120, the leakage current magnitude is 89 µA peak. With the correction implemented in the circuit portion 300, the leakage current magnitude is reduced to 0.4 µA peak (or 0.28 µA root mean square (RMS)), which is well below the 50 µA RMS limit imposed by the IEC 60601-1 standard, Section 8.7.

FIG. 4 is a block diagram illustrating the leakage-current processing circuit 120 according to various examples. In operation, the leakage current 318 is sensed by the current sensor 358 (see FIG. 3). In some examples, the current sensor 358 provides a voltage $V_s$ in proportion to the leakage current's spectrum, whether this be at an AC line frequency, such as 50 Hz or 60 Hz, or at a power-supply switching frequency, such as in the range between 50 kHz and 500 kHz. The voltage $V_s$ is amplified by an amplifier 460 and converted into digital form using an analog-to-digital (A/D) converter 462. A resulting digital signal 463 is Fourier-transformed and inputted into an energy minimization algorithm run on an electronic processor (e.g., a microprocessor) 464. In some examples, the electronic processor 464 is implemented using a computer.

The Fourier transform performed by the processor 464 operates to reveal the spectral content of the leakage current 318, including amplitudes and relative phases of various frequency components thereof. The energy minimization algorithm run by the processor 464 serves to determine the spectral content for the correction current 304 capable of minimizing the energy of the current $i_{patient}$, e.g., in accordance with Eq. (3). In various examples, different respective energy minimization algorithms, e.g., selected from the group consisting of the Nelder-Mead or simplex search algorithm, the Newton-Raphson algorithm, the conjugate gradient algorithm, and the steepest descent algorithm, are used. In a representative example, the used algorithm attempts to cancel the leakage current 318 by performing a search for appropriate parameters of the correction current 304 over three degrees of freedom: amplitude, frequency, and phase.

A control signal 465 from the processor 464 is applied to a direct digital synthesizer (DDS) 466, which is thereby configured to synthesize sinusoids at frequencies determined by the processor 464. The DDS 466 is capable of variously changing amplitudes and phases of individual sinusoids in response to the control signal 465. In some examples, the DDS 446 generates (e.g., via an amplifier) an adjustable output amplitude in the range between about 10V and about 1 kV and imposes an adjustable phase in the range between −180° and +180° for each frequency component it generates. An output signal 467 generated by the DDS 466 in this manner is filtered by a lowpass filter 468 and amplified by a linear amplifier 470. An earth reference coupling transformer 472 then operates to direct a resulting amplified, filtered signal 473 through the resistance 355 to the current coupler 356. In some examples, to accomplish the earth return reference, one end of the isolation transformer's output winding is connected to the equipment's chassis ground (e.g., 216, FIG. 2).

In typical examples, leakage current frequencies correspond to an AC line frequency, which is 50 Hz in ANZ, China, and Europe and 60 Hz in Canada, Japan, South Korea, and the United States. In some examples, once revealed by the Fourier transform performed by the processor 464, the correction frequencies are fixed, and only the amplitudes and phases thereof are varied. In other examples, other leakage current frequencies are present, such as the frequencies from switching power supplies (generally in the 50 kHz to 500 kHz range). Yet, the latter frequency components typically fall below the IEC 60601-1, Section 8.7, 50 μA threshold, and the processor 464 recognizes these components as having lower amplitudes than the offending, non-compliant AC line frequency component(s). Accordingly, in some examples, when a leakage component frequency is of a relatively low level, the algorithm is configured to ignore such components.

In some examples, the algorithm implemented by the processor 464 maps samples into successive correction attempts which are applied as data to the DDS 466. Following the DDS 466, the lowpass filter 468 removes quantization noise from the synthesized tones. In accordance with IEC specifications, such filtering prevents or reduces RF emissions radiating from the catheter cable 111. The signals passed by the lowpass filter 468 are applied to the amplifier 470, which can be implemented using a high voltage, low wattage, linear amplifier. Despite a high voltage output, the power of the amplifier 470 can be relatively low. More specifically, in some examples, 1 W of power is sufficient to provide an amplified output current of 1 mA at 1 kV.

Figure 5:
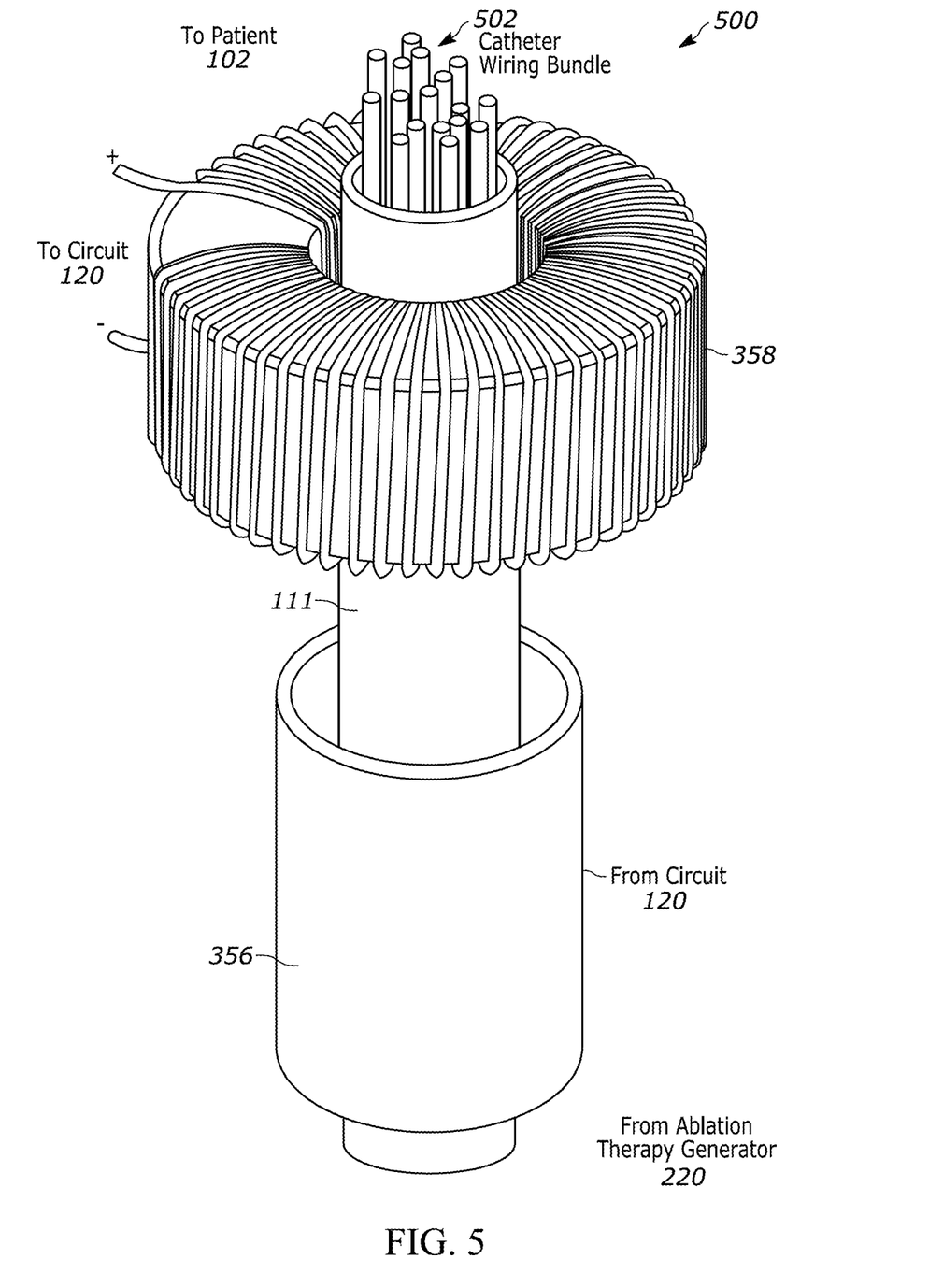
FIG. 5 is an illustration of a circuit assembly used in the circuit portion of FIG. 3 according to various examples.

In some examples, the current coupler 356 is implemented using a sleeve capacitor (also see FIG. 5). Given that sufficient adjustment variability (amplitude, frequency, and phase) is available with respect to the correction current 304, the sleeve capacitor 356 does not need to have a specific capacitance. Rather, it is sufficient that the sleeve capacitor 356 provides adequate coupling compatible with the dynamic-range limits of the amplifier 470. The closed-form Eq. (5) can be used to estimate the capacitance of the sleeve capacitor 356 as follows:

$$capacitance_{sleeve}(\text{pF}) = \frac{length_{in} 2\pi \epsilon_r \epsilon_o \left(0.0254 \frac{m}{\text{in}}\right)}{\log\left(\frac{b}{a}\right)} \quad (5)$$

Eq. (5) gives an estimated capacitance of 500 pF for the sleeve capacitor 356 with the following values and constants:

the inside conductor outer diameter, a=0.5";
the outside conductor inner diameter, b=0.508";
the dielectric permittivity $\epsilon_r$=3.3 for Polyethylene Terephthalate (PET) insulation, 0.004" thick;
the dielectric permittivity of the free space $\epsilon_o$=8.854 pF/m; and
length=1.7 inches.

Other capacitance values of the sleeve capacitor 356 can be obtained, e.g., using other suitable values of the parameters a, b, $\epsilon_r$, and length.

FIG. 5 is an illustration of a circuit assembly 500, including a portion of the catheter cable 111, the sleeve capacitor 356, and the current sensor 358, according to various examples. In the example shown, the current sensor 358 is implemented using a toroidal coil having the catheter cable 111 threaded through the coil's center opening as indicated in FIG. 5. In operation, the undesired current $i_{patient}$ (see Eq. (3)) carried by a wiring bundle 502 of the catheter cable 111 generates, in the toroidal coil 358, a corresponding electromagnetic field (EMF) potential or voltage $V_s$ which is applied to the leakage-current processing circuit 120 as explained above (also see FIG. 4). In response to the voltage $V_s$, the leakage-current processing circuit 120 operates to adjust the current 304 coupled into the wiring bundle 502 of the catheter cable 111 by the sleeve capacitor 356 to substantially null the undesired current $i_{patient}$. In various examples, the toroidal coil 358 and the sleeve capacitor 356 need not be co-located along the catheter cable 111. For example, it may be advantageous to place the toroidal coil 358 relatively close to the ablation generator's front panel and to place the sleeve capacitor 356 around the input AC mains line cord as it enters the equipment rear. Different embodiments permit different respective choices for locating and placing the toroidal coil 358 and the sleeve capacitor 356.

Figure 6:
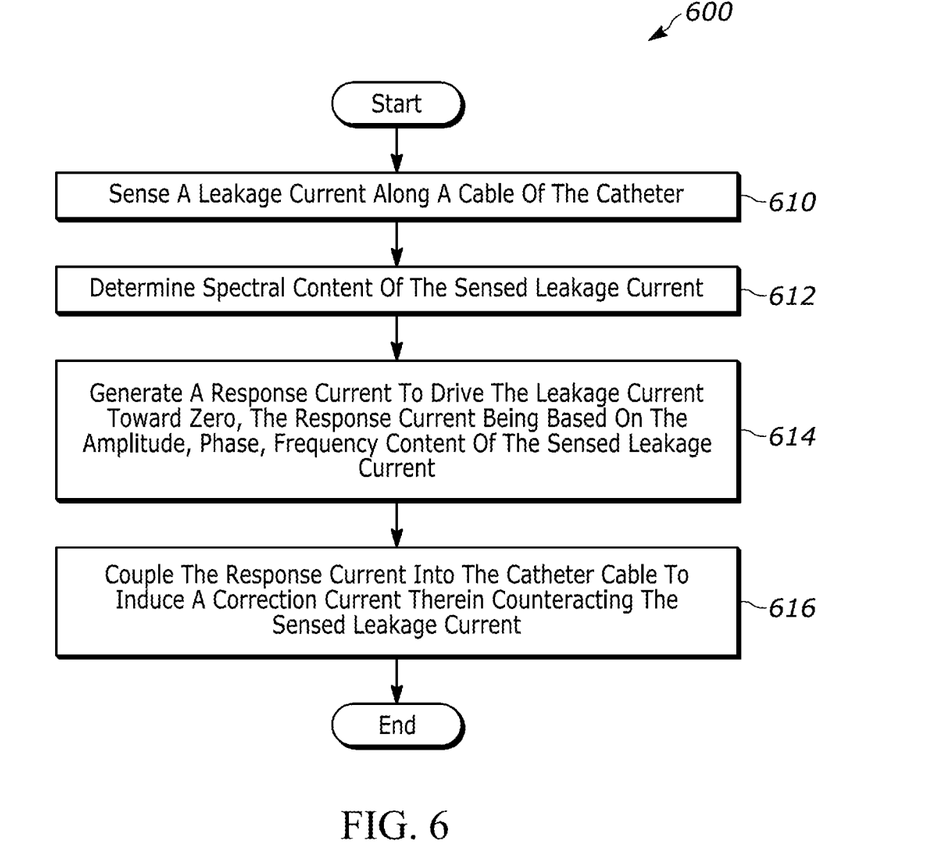
FIG. 6 is a flowchart of an example method of operating the circuit portion of FIG. 3 according to various examples.

FIG. 6 is a flowchart of an example method 600 of operating the circuit portion 300 according to various examples. The method 600 includes sensing the leakage current 318 along the catheter cable 111 (in block 610). In some examples, the sensing is performed using the toroidal coil 358. The method 600 also includes determining spectral content of the sensed leakage current (in block 612). In some examples, the frequency content determination is performed using the processor 464 as described in reference to FIG. 4. The method 600 further includes generating the correction current 304 to drive the sensed leakage current toward zero (in block 614), the correction current 304 being generated based on the amplitude, phase, and frequency content of the sensed leakage current. In some examples, the generation of the correction current 304 is performed using the leakage-current processing circuit 120. The method 600 also includes coupling the correction current 304 into the catheter cable 111 to counteract the sensed leakage current (in block 616). In some examples, the coupling is performed using the sleeve capacitor 356.

According to one aspect, a method of counteracting the leakage current 318 for an ablation catheter is provided. The method includes sensing the leakage current 318 along the catheter cable 111. The method also includes determining an amplitude, phase, and frequency content of the sensed leakage current, generating a correction current 304 to drive the sensed leakage current toward zero, the correction current 304 being generated based on the amplitude, phase, and frequency content of the leakage current 318, and coupling the correction current 304 into the catheter cable 111 to counteract the sensed leakage current.

According to another aspect, a leakage-current limiter (e.g., part of 300, FIG. 3) for an ablation catheter is provided. The leakage-current limiter includes the current sensor 358 configured to sense the leakage current 318 along the cable 111 of the catheter. The leakage-current limiter also includes processing circuitry (e.g., 120, FIG. 3) configured to: determine spectral content of the sensed leakage current; and generate the correction current 304 to drive the sensed leakage current toward zero, the correction current 304 being based on the spectral content of the sensed leakage current. The leakage-current limiter also includes a capacitive structure (e.g., 356, FIGS. 3, 5) configured to couple the correction current 304 into the catheter cable 111 to counteract the sensed leakage current.

In some examples, the leakage current sensor 358 includes a toroidal coil configured to be positioned around the catheter cable 111. In some examples, the capacitive structure comprises a sleeve capacitor 356 configured to be positioned around the catheter cable 111 to induce currents therein to counteract the sensed leakage current. In some examples, the sleeve capacitor 356 is positioned near one end of the catheter cable 111, and the toroidal coil 358 is positioned near the opposite end of the catheter cable 111. In some examples, the processing circuitry includes a fast Fourier transform (FFT) circuit configured to determine spectral content of the sensed leakage current, including determination of relative amplitudes and phases of various frequency components of the sensed leakage current. In some examples, the leakage-current limiter includes a direct digital synthesizer operatively coupled to the FFT circuit and configured to, for each of a plurality of frequency components identified by the Fourier transform of the sensed leakage current, generate a corresponding frequency component having an inverted phase. In some examples, the leakage-current limiter further includes a filter configured to filter out the digitization noise from the output of the direct digital synthesizer. In some examples, the processing circuitry (e.g., the electronic processor 464, FIG. 4) is configured to run an energy reduction algorithm to determine the spectral content for the correction current 304. In some examples, the energy reduction algorithm is configured to drive a difference between the sensed leakage current and the correction current 304 toward zero.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in fewer than all features of a single disclosed embodiment. Thus, the following claims are hereby incorporated into the Detailed Description, with each claim standing on its own as a separately claimed subject matter.

Unless explicitly stated otherwise, each numerical value and range should be interpreted as being approximate as if the word "about" or "approximately" preceded the value or range.

As will be appreciated by one of skill in the art, the concepts described herein may be embodied as a method, a data processing system, a computer program product and/or a computer storage media storing an executable computer program. Accordingly, the concepts described herein may take the form of an entirely hardware embodiment, an entirely software embodiment or an embodiment combining various software and hardware aspects and being generally referred to herein as a "circuit," a "block," or a "module." Any process, step, action and/or functionality described herein may be performed by, and/or associated with, a corresponding module, which may be implemented in software and/or firmware and/or hardware. Furthermore, an example embodiment may take the form of a computer program product on a non-transitory computer usable storage medium having computer program code embodied in the medium that can be executed by a computer. Any suitable tangible computer readable medium may be utilized including hard disks, CD-ROMs, electronic storage devices, optical storage devices, magnetic storage devices, and other suitable storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in a different (e.g., reverse) order, depending upon the functionality/acts involved. Although some of the diagrams include arrows on communication paths to show a primary direction of communication, it is to be understood that communication may occur in the opposite direction to the depicted arrows or bidirectionally.

Computer program code for carrying out operations of the concepts described herein may be written in an object-oriented programming language such as Python, Java®, or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. Accordingly, it is to be understood that the above description is intended to be illustrative and not restrictive. Many embodiments and applications other than the examples provided would be apparent to a person of ordinary skill in the pertinent art upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A medical-treatment apparatus, comprising:
   a current sensor AC-coupled to wiring of a catheter cable;
   a signal-processing circuit configured to generate an output current based on spectral content of a first current sensed by the current sensor in the catheter cable; and
   an AC-signal coupler connected to receive the output current from the signal-processing circuit and positioned along the catheter cable;
   wherein the signal-processing circuit is configured to generate the output current such that a second current coupled by the AC-signal coupler into the wiring of the catheter cable in response to the output current counteracts the first current to force a combination of the first current and the second current to a level that is lower than a fixed threshold value; and
   wherein the signal processing circuit comprises an electronic processor connected to receive a digital signal generated by digitizing an output signal of the current sensor, the electronic processor being configured to determine the spectral content of the first current by applying a Fourier transform to the digital signal.

2. The apparatus of claim 1, further comprising a medical system for delivering, via the catheter cable, ablation-therapy signals to a patient.

3. The apparatus of claim 2,
   wherein the medical system comprises a chassis enclosing:
   a therapy controller connected to apply the ablation-therapy signals to the wiring of the catheter cable; and
   an isolated power supply configured to provide DC power to the therapy controller in response to receiving AC power from AC power mains; and
   wherein at least a portion of the first current is induced in the wiring of the catheter cable through parasitic AC coupling between the chassis and the wiring.

4. The apparatus of claim 1, wherein the fixed threshold value is selected to comply with an IEC 60601-1 standard.

5. The apparatus of claim 1,
   wherein the current sensor comprises a toroidal coil; and
   wherein the catheter cable is threaded through a center opening of the toroidal coil.

6. The apparatus of claim 1, wherein the AC-signal coupler comprises a sleeve capacitor wrapped around the catheter cable.

7. The apparatus of claim 1, wherein the electronic processor is further configured to apply an energy minimization algorithm to the spectral content to determine amplitudes and phases for frequency components of the output current.

8. The apparatus of claim 7, wherein the signal processing circuit further comprises a signal synthesizer connected to the electronic processor and configured to generate the output current based on the amplitudes and the phases of the frequency components determined by the electronic processor.

9. The apparatus of claim 8, further comprising a medical system for delivering ablation-therapy signals via the catheter cable, the medical system comprising a grounded chassis enclosing at least an isolated power supply configured to provide DC power to a portion of the medical-treatment apparatus in response to receiving AC power from AC power mains; and
   wherein the signal processing circuit further comprises an isolation transformer connected between the signal synthesizer and the AC-signal coupler, the isolation transformer having one end of a wire winding thereof electrically connected to the grounded chassis.

10. The apparatus of claim 8, wherein the signal processing circuit further comprises a lowpass filter connected between the signal synthesizer and an output port of the processing circuit configured to output the output current.

11. The apparatus of claim 8, wherein the signal processing circuit further comprises an electrical amplifier connected between the signal synthesizer and an output port of the processing circuit configured to output the output current.

12. A medical-treatment method, comprising:
    sensing a first current in a catheter cable using a current sensor AC-coupled to wiring of the catheter cable;
    determining, with a signal-processing circuit, spectral content of the first current by applying a Fourier transform to a digital signal generated by digitizing an output signal of the current sensor;
    applying, with the signal-processing circuit, an energy minimization algorithm to the spectral content to determine amplitudes and phases for frequency components of the output current;
    generating, with the signal-processing circuit, an output current based on the spectral content; and
    applying the output current to an AC-signal coupler to couple a second current into the wiring such that the second current counteracts the first current to force a combination of the first current and the second current to a level that is lower than a fixed threshold value.

13. The method of claim 12, wherein at least a portion of the first current is induced in the wiring of the catheter cable through parasitic AC coupling between a chassis and the wiring, the chassis enclosing at least an isolated power supply configured to provide DC power medical-treatment equipment in response to receiving AC power from AC power mains.

14. The method of claim 12, further comprising generating, with the signal-processing circuit, the output current based on the amplitudes and the phases.

15. The method of claim 12, further comprising selecting the fixed value in compliance with an IEC 60601-1 standard.

16. The method of claim 12,
wherein the current sensor comprises a toroidal coil;
wherein the catheter cable is threaded through a center opening of the toroidal coil; and
wherein the AC-signal coupler comprises a sleeve capacitor wrapped around the catheter cable.

17. A medical-treatment apparatus, comprising:
a current sensor AC-coupled to wiring of a catheter cable;
a signal-processing circuit configured to generate an output current based on spectral content of a first current sensed by the current sensor in the catheter cable;
an AC-signal coupler connected to receive the output current from the signal-processing circuit and positioned along the catheter cable; and
a medical system for delivering, via the catheter cable, ablation-therapy signals to a patient,
wherein the signal-processing circuit is configured to generate the output current such that a second current coupled by the AC-signal coupler into the wiring of the catheter cable in response to the output current counteracts the first current to force a combination of the first current and the second current to a level that is lower than a fixed threshold value;
wherein the medical system comprises a chassis enclosing:
a therapy controller connected to apply the ablation-therapy signals to the wiring of the catheter cable; and
an isolated power supply configured to provide DC power to the therapy controller in response to receiving AC power from AC power mains; and
wherein at least a portion of the first current is induced in the wiring of the catheter cable through parasitic AC coupling between the chassis and the wiring.

18. The apparatus of claim 17,
wherein the current sensor is positioned along a first portion of the catheter cable; and
wherein the AC-signal coupler is positioned along a second portion of the catheter cable, the second portion of the catheter cable being closer to the therapy controller along the catheter cable than the first portion of the catheter cable.

19. A medical-treatment method, comprising:
sensing a first current in a catheter cable using a current sensor AC-coupled to wiring of the catheter cable;
determining, with a signal-processing circuit, spectral content of the first current by applying a Fourier transform to a digital signal generated by digitizing an output signal of the current sensor;
generating, with the signal-processing circuit, an output current based on the spectral content;
applying the output current to an AC-signal coupler to couple a second current into the wiring such that the second current counteracts the first current to force a combination of the first current and the second current to a level that is lower than a fixed threshold value; and
delivering, via the catheter cable, ablation-therapy signals to a patient.

20. A medical-treatment method, comprising:
sensing a first current in a catheter cable using a current sensor AC-coupled to wiring of the catheter cable;
determining, with a signal-processing circuit, spectral content of the first current by applying a Fourier transform to a digital signal generated by digitizing an output signal of the current sensor;
generating, with the signal-processing circuit, an output current based on the spectral content; and
applying the output current to an AC-signal coupler to couple a second current into the wiring such that the second current counteracts the first current to force a combination of the first current and the second current to a level that is lower than a fixed threshold value,
wherein at least a portion of the first current is induced in the wiring of the catheter cable through parasitic AC coupling between a chassis and the wiring, the chassis enclosing at least an isolated power supply configured to provide DC power medical-treatment equipment in response to receiving AC power from AC power mains.

* * * * *